US005422438A

United States Patent [19]

Lamome

[11] Patent Number: 5,422,438

[45] Date of Patent: Jun. 6, 1995

[54] ELECTRICAL CRIMP CONNECTOR

[75] Inventor: Alain Lamome, Pierrelaye, France

[73] Assignee: Raychem SA, France

[21] Appl. No.: 94,201

[22] PCT Filed: Feb. 4, 1992

[86] PCT No.: PCT/GB92/00210

§ 371 Date: Aug. 3, 1993

§ 102(e) Date: Aug. 3, 1993

[30] Foreign Application Priority Data

Feb. 7, 1991 [GB] United Kingdom ................. 9102661

[51] Int. Cl.[6] ....................... H02G 15/10; H01R 43/00

[52] U.S. Cl. .................................... 174/84 C; 29/871; 174/76; 439/877; 439/882

[58] Field of Search ..................... 174/84 C, 76, 84 R; 29/869, 871; 439/877, 882

[56] References Cited

U.S. PATENT DOCUMENTS

| | | | |
|---|---|---|---|
| 3,010,183 | 11/1961 | Forney, Jr. . | |
| 3,585,275 | 6/1971 | Gillemot et al. | 174/76 |
| 4,600,804 | 7/1986 | Howard | 174/84 |

FOREIGN PATENT DOCUMENTS

| | | | |
|---|---|---|---|
| 0008984 | 3/1980 | European Pat. Off. . | |
| 0086110 | 8/1983 | European Pat. Off. | B29C 25/00 |
| 0108518 | 5/1984 | European Pat. Off. | H01R 4/70 |
| 0191609 | 8/1986 | European Pat. Off. | H02G 150/013 |
| 0299797 | 1/1989 | European Pat. Off. | H01R 4/70 |
| 2629645 | 11/1961 | France . | |
| 573920 | 12/1945 | United Kingdom . | |
| 1134240 | 11/1968 | United Kingdom . | |
| 2185155 | 7/1987 | United Kingdom . | |

*Primary Examiner*—Morris H. Nimmo
*Attorney, Agent, or Firm*—Sheri M. Novack; Herbert G. Burkard

[57] ABSTRACT

An electrical crimp connector (1) comprises a crimp barrel (3) located within an insulating sleeve (4), and a quantity of gel (5) located within each end region of the insulating sleeve at each end of the crimp barrel. Each quantity of gel contains an aperture (10) to allow wires (2) to be inserted into the crimp barrel. Once the connector has been crimped, the gel located within each end region of the insulating sleeve seals it against moisture ingress, forming a moisture-resistant electrical connection.

11 Claims, 1 Drawing Sheet

ELECTRICAL CRIMP CONNECTOR

Figure 1:
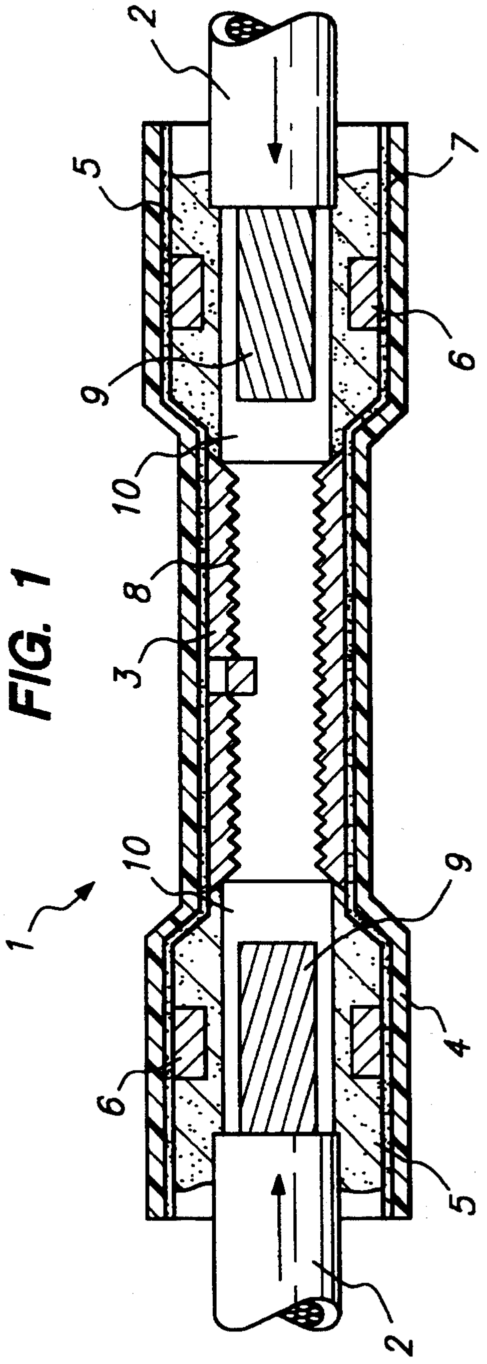

This invention relates to an electrical crimp connector for connecting two or more elongate electrical conductors.

Hitherto, electrical crimp connectors have been proposed which have sought to prevent corrosion of the metal exposed within them by various means. These means have tended either to be unsuccessful or time consuming and requiring the use of specialised equipment to produce the necessary protection. For example, the use of grease to prevent water contacting the exposed metal of the connection involves the risk that the grease may be easily dislodged, or indeed that the action of crimping may force the grease out of the connection. One successful method of providing a good seal against corrosion is the use of a heat-recoverable sleeve containing a hot-melt adhesive, the sleeve being heated to seal the device after crimping, but this method is more time consuming than one which merely involves crimping actions. Furthermore, the use of heat may be inappropriate in certain cases.

According so one aspect, the present invention provides a device for forming a butt splice between two or more elongate electrical conductors, which comprises a crimp barrel having two open ends, an electrically insulating sleeve located about and extending beyond the ends of the crimp barrel, and a quantity of gel located within each end region of the insulating sleeve beyond each end of the crimp barrel for sealing each end of the splice against ingress of moisture, each quantity of gel containing an aperture to allow the insertion of one or more elongate electrical conductors into each end of the crimp barrel.

The present invention has the advantage that it provides a device which is relatively simple to employ in the production of an essentially corrosion resistant connection between two or more elongate electrical conductors, involving only the action of crimping to form and seal the connection. The invention allows the conductors to be located within the crimp barrel with little disturbance of the gel material. Thus, it is possible to form a splice that has a relatively low contact resistance due to the absence of gel between the conductors and the crimp barrel. Furthermore, the absence of gel from the crimp barrel means that the conductors may be inserted and located more easily and any tendency of the conductors to be forced out of the crimp barrel before or during crimping is reduced.

According to a preferred feature of the invention, the device includes a ferrule (in the form of a hollow cylinder or ring) located beyond each end of the crimp barrel, between the insulating sleeve and the gel. These ferrules may provide a number of advantages. For example, they may protect the elongate electrical conductors inserted into the device from strain arising from their movement (referred to hereafter as strain relief). Alternatively, or additionally, the ferrules may contribute to the environmental sealing of a splice formed with the device by being capable of being crimped in order to compress at least part of the gel against an electrical conductor inserted into the crimp barrel. Thus, the invention also provides a device for forming a butt splice between two or more elongate electrical conductors, which comprises a crimp barrel having two open ends, an electrically insulating sleeve located about and extending beyond the ends of the crimp barrel, a quantity of gel located within each end region of the insulating sleeve beyond each end of the crimp barrel for sealing each end of the splice against ingress moisture, and a ferrule located beyond each end of the crimp barrel between the insulating sleeve and the gel, each ferrule being capable of being crimped in order to compress at least part of the gel against an electrical conductor inserted into the crimp barrel and/or to provide strain relief for the electrical conductor.

The electrically insulating sleeve of the device provided by the invention preferably comprises a cross-linked polymeric material, such as, for example polytetrafluoroethylene, ethylene tetrafluoroethylene or polyvinylidine fluoride. More preferably however, the sleeve comprises a nylon material such as nylon 6 or nylon 11, but especially nylon 12.

In some cases it may be desirable for each end of the insulating sleeve to have an inwardly curved edge portion that leaves an aperture that will allow the insertion of one or more elongate electrical conductors therein but will hinder the exudation of gel from the sleeve, both prior to and during the use of the device.

It has been found that for certain elongate electrical conductors, such as, for example some single copper wires, it is advantageous for the crimp barrel to have an internal profile that is capable of gripping them. For example, the inside of the crimp barrel may contain teeth, barbs or gripping edges which can help to strengthen a connection formed by the device. However, for certain other elongate electrical conductors, such as for example some multi-stranded copper wires, no advantage is necessarily gained from the crimp barrel containing teeth, and a smooth internal profile may be sufficient to form a strong connection (once the device has been crimped).

It is preferable for the crimp barrel to be formed from an electrically conductive material, such as copper for example. Where tin-plated elongate conductors are to be connected, it is highly desirable for the crimp barrel to have an internal surface of tin, such as with a tin-plated copper crimp barrel, so as to reduce the risk of galvanic corrosion.

The device according to the invention includes a quantity of gel located within each end region of the insulating sleeve beyond each end of the crimp barrel for sealing each end of the splice against ingress of moisture. The term 'gel' as used herein is intended to mean a liquid-extended polymer composition. Such compositions normally contain a three-dimensional network of cross-linked molecular chains and preferably include at least 300 parts, more preferably at least 500 parts by weight of extender liquid per 100 parts by weight of the polymer composition. The gel used in the invention preferably has a cone penetration value (measured by ASTM D217) within the range of from 100 to 400 $10^{-1}$ millimeters, more preferably 100 to 350 $10^{-1}$ millimeters; an ultimate elongation (measured by ASTM D412) preferably greater than 100%, with substantially elastic deformation to an elongation of preferably at least 100%; and ultimate tensile strength (ASTM D412) preferably less than 1 MegaPascal.

The polymer composition may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent application number PCT/GB87/00506. The extender liquids employed in the gel preferably comprise oils conventionally used to extend elastomeric materials. The oils may be hydrocarbon oils, for example paraffinic or naphthenic oils, synthetic oils for example polybutene or polypropene oils, and mixtures thereof. The preferred oils are mixtures of non-aromatic paraffins and naphthenic hydrocarbon oils. Suitable gels can also be prepared by curing reactive silicones with non-reactive extender silicones. The gel may contain known additives such as moisture scavengers (eg. benzoyl chloride), antioxidants, pigments and fungicides.

The function of the gel in the device according to the invention is to seal it from moisture ingress once the elongate electrical conductors which are required to be spliced, have been inserted into the crimp barrel and crimped. This is best achieved by applying pressure to the gel, since in this state it behaves in a manner similar to a liquid, in that it is capable of flowing and conforming around intricate shapes and adhering to solid surfaces.

In a preferred embodiment of the invention the ferrules, located beyond each end of the crimp barrel between the insulating sleeve and the gel, are capable of being crimped about each elongate conductor inserted therein. This may have the advantage of increasing the capability of the ferrules to provide strain relief to the elongate conductors. Additionally or alternatively, crimping the ferrites about the conductors can have the effect of compressing the gel, and hence may aid the sealing of the device. In a particularly preferred embodiment of the invention, at least a portion of each quantity of gel is located between its corresponding ferrule and the crimp barrel. When this device is crimped in the regions of the crimp barrel and each ferrule, each portion of gel located between a ferrule and the crimp barrel will normally be compressed (depending upon the degree of crimping and the total cross-sectional area of the insulated conductors inserted into each end of the device). When the gel is compressed, it 'wets' the inner surface of the insulating sleeve and the outer surfaces of the insulated conductors, sealing the splice from moisture ingress. In addition, the ferrules themselves, together with any gel located beyond the ferrules at each end of the device, may also serve to protect the splice from foreign matter such as dirt etc.

In order to ensure a secure, sealed connection, the crimp barrel and the ferrules may be fixed in position within the device. This my be achieved by, for example, bonding the crimp barrel and the ferrules to the internal surface of the insulating sleeve. In particular, the inside of the sleeve may be coated with a layer of adhesive. Adhesives that may be employed include hot melt adhesives, eg. those based on ethylene homo or copolymers, eg. ethylene vinyl acetate or ethylene ethyl acrylate, and polyamide adhesives, for example formed from polyamides having a relatively large number (eg. $>15$) of carbon atoms between adjacent carbonyl groups, preferred polyamides being based on dimer diamines as described in U.S. Pat. Nos. 4,018,733 and 4,181,775.

According to another aspect, the invention provides a method of forming a butt splice between two or more insulated elongate electrical conductors by means of a device which comprises a crimp barrel having two open ends, an electrically insulating sleeve located about and extending beyond the ends of the crimp barrel, and a quantity of gel located within each end region of the insulating sleeve beyond each end of the crimp barrel for sealing each end of the splice against ingress of moisture, each quantity of gel containing an aperture to allow the insertion of one or more elongate electrical conductors into each end of the crimp barrel, the method comprising:

(i) stripping a length of insulation from the end of each conductor;

(ii) inserting one or more of the conductors into each end of the device so that the end of each conductor extends into the crimp barrel and a portion of the insulation is surrounded by the insulating sleeve; and (iii) crimping the crimp barrel about the conductors.

When the device contains a crimpable ferrule located beyond each end of the crimp barrel between the insulating sleeve and the gel, the method includes a further step:

(iv) crimping each ferrule about the insulation of each conductor inserted therein.

Because the gel material is deformable, it is often possible for one or both quantities of gel in the device to have an aperture cross-sectional area that is smaller than the combined cross-sectional area of each insulated conductor inserted therein. This can be advantageous, since the act of inserting the conductors into the device may compress the gel between the conductors and the internal surface of the device, and crimping preferably reinforces this compressive action, enhancing the moisture seal.

Figure 2:
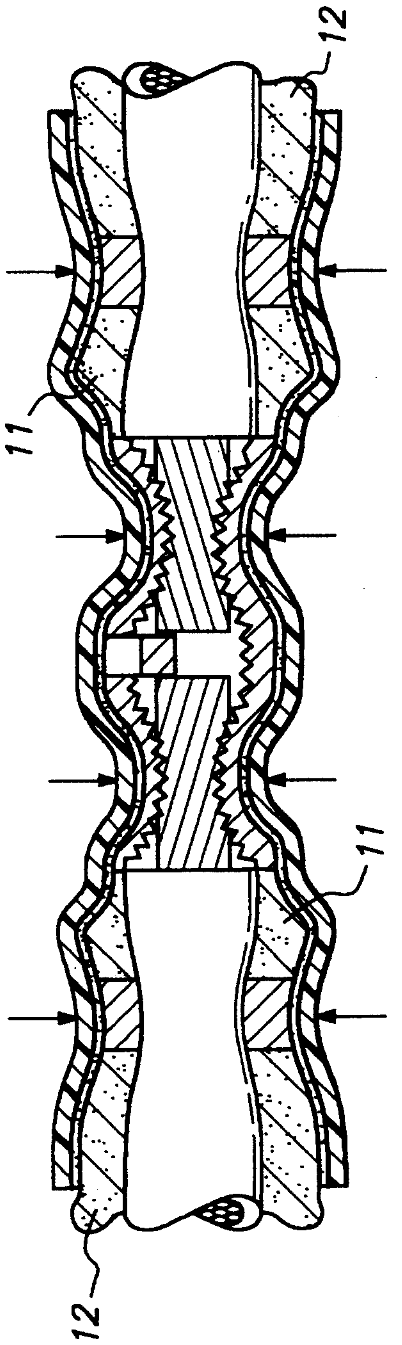

The device according to the invention will now be described by way of example with reference to the accompanying drawings in which:

FIG. 1 is a sectional elevation along the axis of a device according to the present invention and a pair of insulated wires; and FIG. 2 is a sectional elevation along the axis of a butt splice between two insulated wires formed by the device of FIG. 1.

Referring to FIG. 1, a device 1 for forming a butt splice between two (or more) electrically insulated cables 2 comprises a crimp barrel 3, an electrically insulating sleeve 4 located about and extending beyond the ends of the crimp barrel (the diameter of the sleeve beyond each end of the crimp barrel being greater than that in the region located about the crimp barrel), a quantity of gel 5 located within each end region of the insulating sleeve beyond each end of the crimp barrel, two ferrules 6, located beyond each end of the crimp barrel between the insulating sleeve and the gel and a layer of adhesive 7 coated onto the internal surface of the insulating sleeve to bond the crimp barrel and the strain relief ferrules in place. The crimp barrel 3 contains teeth 8 for gripping the bare wire 9 of each of the two insulated cables 2 and thus forming an electrical contact between them. Each quantity of gel contains an aperture 10 to allow the insertion of the cables into the device. The diameter of each gel aperture 9 is shown to be smaller than the diameter of the insulation of the wire to be inserted into it, to illustrate the fact that because of its deformable nature, the gel 5 is able to allow the insertion of the insulated wire.

FIG. 2 shows the completed splice between the two cables of FIG. 1, formed by the cables having been inserted into the device of FIG. 1, and the device being crimped in the regions shown by the arrows. The two quantities of gel 5 are seen to be compressed in the region 11 between each ferrule 6 and the crimp barrel 3, thus sealing the electrical contacts from moisture. Furthermore, each of the ferrules, together with the outermost portions of gel 12 serve to increase the degree of protection of the splice, particularly from foreign bodies such as dirt.

I claim:

1. A device for forming a butt splice between two or more elongate electrical conductors, which comprises a crimp barrel, an electrically insulating sleeve, two quantities of gel and two ferrules, wherein the crimp barrel has two open ends, the sleeve is located about and extends beyond the ends of the crimp barrel and each quantity of gel is located within an end region of the insulating sleeve beyond a respective end of the crimp barrel for sealing each end of the splice against ingress of moisture, and each ferrule is located beyond a respective end of the crimp barrel, between the insulating sleeve and the gel, and wherein each quantity of gel contains an aperture to allow the insertion of one or more elongate electrical conductors into each end of the crimp barrel.

2. A device as claimed in claim 1, wherein each ferrule is capable of being crimped about a respective conductor inserted therein.

3. A device as claimed in claim 1, wherein at least a portion of each quantity of gel is located between its corresponding ferrule and the crimp barrel.

4. A device as claimed in claim 1, wherein the crimp barrel and the ferrules are bonded to the internal surface of the insulating sleeve.

5. A device as claimed in claim 1, wherein each end of the electrically insulating sleeve has an inwardly curved edge portion that leaves an aperture that will allow the insertion of an elongate electrical conductor therein but will hinder the exudation of gel from the sleeve.

6. A device for forming a butt splice between two or more elongate electrical conductors, which comprises a crimp barrel, an electrically insulating sleeve, two quantities of gel and two ferrules, wherein the crimp barrel has two open ends, the electrically insulating sleeve is located about and extends beyond the ends of the crimp barrel, each quantity of gel is located within an end region of the insulating sleeve beyond a respective end of the crimp barrel for sealing each end of the splice against ingress of moisture, and each ferrule is located beyond a respective end of the crimp barrel between the insulating sleeve and the gel, and is capable of being crimped in order to compress at least part of the gel against an electrical conductor inserted into the crimp barrel and/or to provide strain relief for the electrical conductor.

7. A device as claimed in claim 6, wherein at least a portion of each quantity of gel is located between its corresponding ferrule and the crimp barrel.

8. A device as claimed in claim 6, wherein the crimp barrel and the ferrules are bonded to the internal surface of the insulating sleeve.

9. A device as claimed in claim 6, wherein each end of the electrically insulating sleeve has an inwardly curved edge portion that leaves an aperture that will allow the insertion of an elongate electrical conductor therein but will hinder the exudation of gel from the sleeve.

10. A method of forming a butt splice between two or more insulated elongate electrical conductors by means of a device which comprises a crimp barrel, an electrically insulating sleeve, two quantities of gel and two crimpable ferrules, wherein the crimp barrel has two open ends, the sleeve is located about and extends beyond the ends of the crimp barrel and each quantity of gel is located within an end region of the insulating sleeve beyond a respective end of the crimp barrel for sealing each end of the splice against ingress of moisture, and each crimpable ferrule is located beyond a respective end of the crimp barrel between the insulating sleeve and the gel, and wherein each quantity of gel contains an aperture to allow the insertion of one or more elongate electrical conductors into each end of the crimp barrel, the method comprising:

(i) stripping a length of insulation from the end of each conductor;

(ii) inserting one or more of the conductors into each end of the device so that the end of each conductor extends into the crimp barrel and a portion of the insulation is surrounded by the insulating sleeve; and (iii) crimping each ferrule about the insulation of each conductor inserted therein.

11. A method as claimed in claim 10, wherein each quantity of gel has an aperture cross-sectional area that is smaller than the combined cross-sectional area of each insulated conductor inserted therein.

* * * * *